July 28, 1931. L. DOROGI ET AL 1,816,472
HOLLOW INFLATABLE SHEET RUBBER BODIES
AND PROCESS OF PRODUCING THE SAME
Original Filed Aug. 22, 1925  3 Sheets-Sheet 1
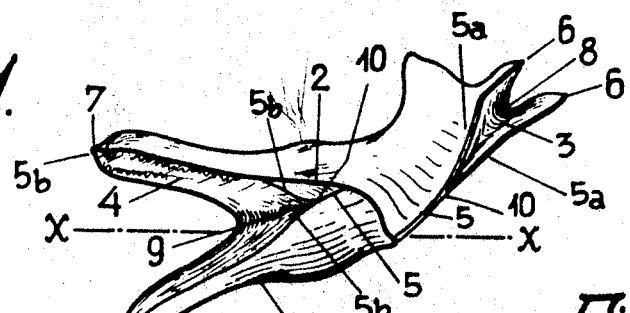
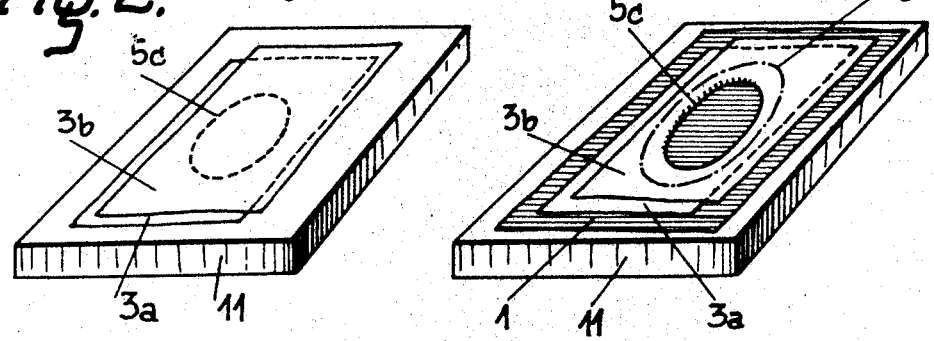
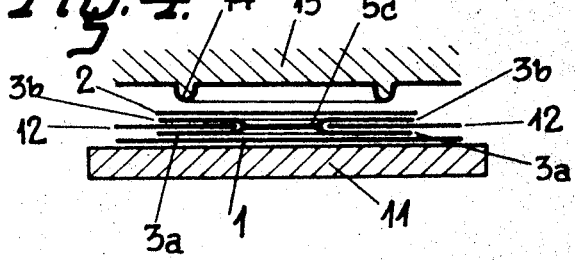
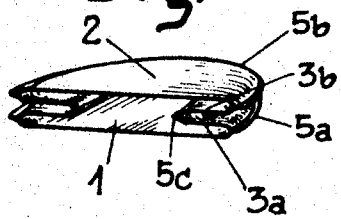
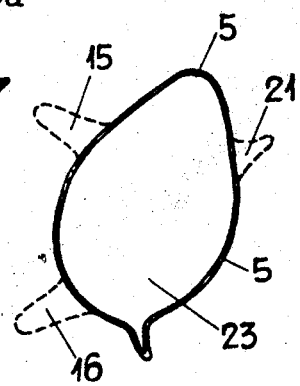
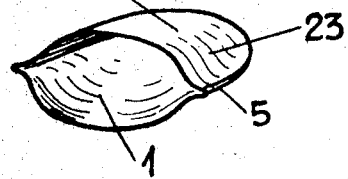
INVENTORS
LAJOS DOROGI,
ISTVÁN DOROGI,
BY Steward & McKay
their ATTORNEYS July 28, 1931.                    L. DOROGI ET AL                 1,816,472
                    HOLLOW INFLATABLE SHEET RUBBER BODIES
                    AND PROCESS OF PRODUCING THE SAME
                      Original Filed Aug. 22, 1925     3 Sheets-Sheet 2
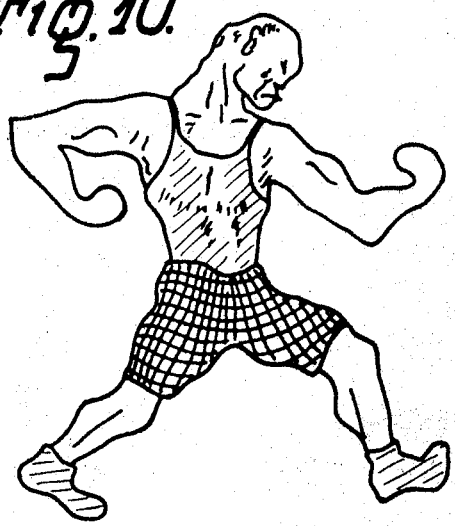
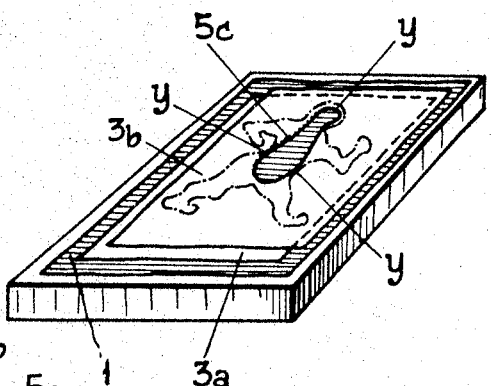
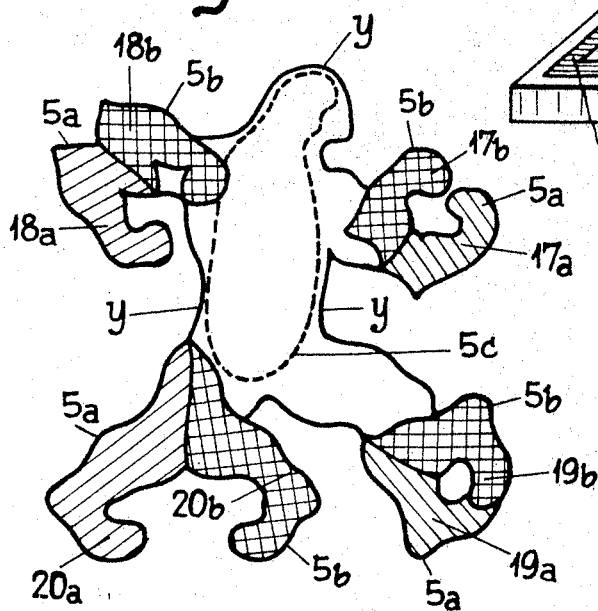
INVENTORS
LAJOS DOROGI,
ISTVÁN DOROGI.
BY Steward & McKay
their ATTORNEYS

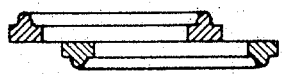
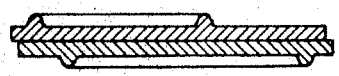
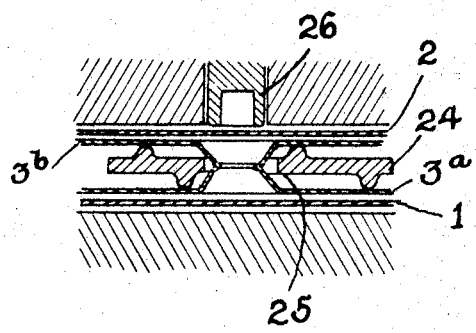
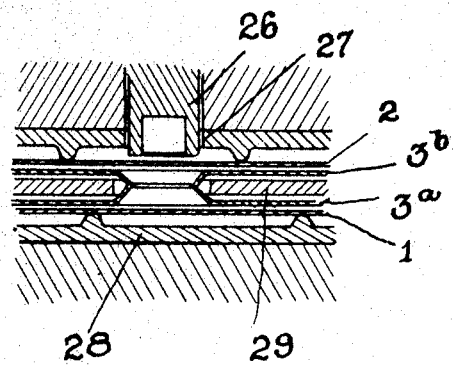
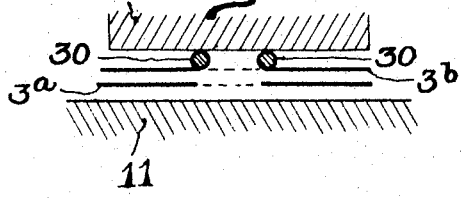
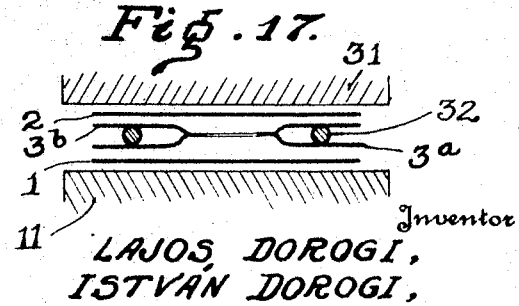

Patented July 28, 1931

1,816,472

UNITED STATES PATENT OFFICE

LAJOS DOROGI AND ISTVÁN DOROGI, OF BUDAPEST, HUNGARY

HOLLOW INFLATABLE SHEET RUBBER BODIES AND PROCESS OF PRODUCING THE SAME

Original application filed August 22, 1925, Serial No. 51,822, and in Hungary September 11, 1924. Divided and this application filed November 22, 1928. Serial No. 321,223.

This invention relates to hollow inflatable sheet rubber bodies and the process of producing the same without the use of molds. The process of the invention is especially adapted for the production of hollow inflatable bodies as toys, simulating human and animal forms.

The present application is a division of application Serial No. 51,822, filed by us on August 22, 1925.

In the manufacture of toys of so-called mineralized, comparatively heavy rubber plates, the production of the molds, their sculpture and chasing, is very expensive, and the cost of production is in addition greatly enhanced by the fact that this class of goods is made of particularly heavy rubber plates and that therefore the consumption of material is very considerable.

Production of inflatable hollow rubber bodies without the use of molds has also heretofore been accomplished by employing two unvulcanized rubber plates or sheets, one superposed on the other, and stamping out from both sheets simultaneously, by means of a suitably shaped and dulled die, the desired figure, the cut edges of the two sheets becoming welded and adhering to each other along the outline of the figure by the pressure of the die in the stamping out operation.

While in this method of manufacture great savings are made by reason of the absence of molds and by reason of the moderate consumption of material, only relatively flat hollow bodies arched to a somewhat lens shape upon inflation can be produced and consequently the variety of forms obtainable is very limited. Only primitive or simple forms are obtainable; and, in the case of animal toys, the parts of the body that are to project outwardly, such as legs, arms, ears, etc., must be subsequently attached by means of paste or the like.

Not only does such attachment of these parts, such as arms and legs of figures simulating human and animal forms, require an additional operation after the stamping and welding operations have completed the main body portion but it is a difficult matter to separately attach the extremities to the completed body portion in such a manner that upon inflation of the whole, the extremities will project from the main body portion in the desired and natural manner. Generally the result is an extreme and unnatural convergence or divergence of the opposite members of a pair of extremities, this being especially true of limbed animal forms, the opposite legs of each pair either converging too much or spreading laterally from the main body portion in an unnatural manner, and in a manner which does not properly support the inflated form upon its feet.

Attempts have been made to avoid these disadvantages, especially of the separate attachment of limb members, by cutting out the side view outline of the body from the two superposed sheets in such a manner that between the side leaves intermediate pieces, folded through the middle, may be fitted in the body regions where prominences are to be presented on opposite sides of the medium plane of the inflated form, as for example limbs of human and animal forms.

Mass production of such hollow bodies is, however, difficult because the exact fitting in of the intermediate pieces referred to at their proper places and the correct union of the same along their outer margins with the side pieces of the form require considerable skill, care and time. Moreover, it is obvious that the fitting in of individual pieces between the outer side pieces of the form produces junction points of three seams, that is the junction of the two seams between the marginal edges of the insert pieces and the opposite side pieces and the seam uniting the two side pieces together. These are places of inherent weakness and generally require reinforcement by special patches put on.

According to another method, described in U. S. patent to Roberts 1,504,079, extremities situated on both sides of the median plane of an animal figure may be obtained by using a folded rubber-sheet insertion introduced between the two rubber sheets forming the lateral parts of the figure in the original formation of the article. This method is subject to the objections, however, that it greatly limits the shapes obtainable and involves the use of a plurality of doubled rubber-sheet insertions for a plurality of pairs of extremities in those cases where the folded edge of the insertion for the several pairs of extremities cannot be brought into the same straight line. Thus, for example, animal figures having legs and ears as extremities, when made according to the method described in the Roberts Patent 1,504,079, require a separate folded rubber-sheet insertion for the legs and a separate one for the ears.

Another disadvantage in the employment of the insert pieces in both of the methods referred to above is the fact that as a result of the straight union or fold of the two layers of the insert piece, positioned inwardly of the adjacent marginal edges of the body sides, an imperfection appears in the representation produced by the form upon its inflation which manifests itself in different ways according to the form sought to be represented. It is especially disturbing in quadruped animal forms. In such forms, as a result of the straight union or fold of the two layers of the insert piece, positioned inwardly of the marginal edges of the body sides in the deflated condition of the form, an inflation of the form causes an excessive spreading of the limbs on the opposite sides of the median line of the insert piece, which spreading presents a distortion from the natural form desired.

An object of the present invention is an improved process for the production of this type of thin-walled hollow inflatable bodies without the use of molds avoiding the disadvantages of manufacture and the defects in the completed bodies or forms referred to above. The improved process contemplates a simple process of operation whereby bodies may be produced, the individual parts of which are positioned in various planes and thus, for example, an inflatable hollow body in human form may be produced possessing a face profile, a belly profile and a back profile, as well as arms and legs, all presenting a more perfect reproduction of the natural form without material increase in the cost of manufacture.

In accordance with the present invention, in place of the individual or separate folded intermediate pieces independently fitted in between the outer side pieces of the form in its process of manufacture, as first described above, or introduced between the two rubber sheets forming the lateral parts of the figure in the original formation of the article, as in the method of the Roberts patent described above, one insert piece is employed during the production of the form extending between the two side pieces of the body form along their entire side profile outline, the insert piece consisting of two parts united by a central seam running in a closed curvilinear outline, the two parts being joined in outer marginal edges to the side body pieces. One general characteristic of such new forms, in their completed condition before inflation and flat folded along their seams (and which characteristic is an important factor in avoiding the hereinbefore mentioned distortion upon inflation of the form) may be defined as a union of the two leaves or parts of the insert piece by a seam produced along a curvilinear outline representing a natural contour or profile of that particular intermediate body region which is occupied by the insert piece upon inflation of the form.

In carrying out the process, this insert piece is formed by stamping out from two superposed plates of the sheet rubber material the inner profile by a die having a cutting and welding edge so that the two pieces are welded or seamed together along the profile line. Because of the employment of two individual plates or layers in making the insert piece and cut-seaming them together, it is possible to give any desired curve to the joining seam of the two parts or flaps of the insert piece, thus avoiding the straight joining edge of the two flaps of the folded insert piece hereinbefore referred to, and thus avoiding distortion of the form, especially the extreme spreading of limb members, which occurs when a folded insert piece is employed. A further advantage of the two-part insert piece with a curvilinear connecting seam between the parts is the possibility of extending the same along as great a portion of the body outline as desired by the proper outline of the joining seam.

A distinguishing feature of the present process is the extension of the insert piece, in the formation of the body, between the outer side pieces throughout the entire outline of the main body portion, so that in the completed and inflated form, the curvilinear line of union between the two parts which make up the insert piece extends entirely about the body through the body regions intermediate the lateral surfaces or sides. In this way a hollow-inflatable body can be produced which at various places presents prominences extending in the desired manner on both sides of the intermediate body regions referred to and which presents the intermediate body portions with the proper surface contour or profile. And such production can be had by two dieing and welding operations, one forming the closed curvilinear line or center profile of the two part insert piece along which line the two parts are cut seamed together, and the other cut-seaming the parts of the insert piece to the side plates along the side outline or profile of the body.

The foregoing objects and principles of our invention and other objects and principles thereof will more fully appear by reference to the accompanying drawings and description hereinafter given in which we have presented examples and forms of our invention in comparison with known processes of making such inflatable bodies. While we have given the best examples of practice and forms of our invention now known to us, it is to be understood that they are merely illustrative of the principles involved and that changes may be made in the subject-matter and forms disclosed without departing from the broad spirit of our invention as set forth in the appended claims, and that in some cases certain features of our invention may be used without a corresponding use of other features.

In the drawings:

Fig. 1 is a sectional perspective view of an animal form in inflated condition, produced according to one of the prior art processes hereinbefore referred to;

Figs. 2 and 3 are perspective views of a foundation plate with sheet rubber material thereon illustrating certain fundamental principles involved in our process in the production of a very simple form;

Fig. 4 is a sectional view, diagrammatic in character, showing the arrangement of the sheet rubber parts and stamping operations thereon, involved in our process;

Fig. 5 is a sectional perspective view of a simple form of hollow body, in uninflated condition, produced in following the fundamental steps illustrated in Figs. 2, 3 and 4;

Figs. 6 and 7 are views which are presented to further explain the distinctions between our process and the known prior processes hereinbefore referred to. Fig. 6 is a sectionalized view of a simple body form, inflated, made up of two sheets cut-seamed together along a side outline of the body to be produced. Fig. 7 is a longitudinal sectional view, somewhat diagrammatic in character, of a body form of the character represented in Fig. 6, with prominences or projections, intended in the completed form to extend from the main body portion, represented in dotted outlines.

Fig. 8 is a perspective view of a foundation plate with sheet rubber material thereon illustrating the arrangement of the sheets or layers of rubber and the character of the stamping operations employed in one example of our process by which the figures or forms shown in Figs. 9, 10 and 11 are produced.

Fig. 9 is a side view of the form shown in Figs. 10 and 11 at a certain stage of the process before final completion of the form ready for inflation.

Figs. 10 and 11 are front and side elevational views, respectively, of the completed and inflated form, representing a boxer as a human figure.

Figs. 12, 13, 14, 15, 16 and 17 illustrate forms of construction of dies and other parts of stamping and welding means which may advantageously be used in our process.

In the drawings, attention is first directed to Fig. 1, illustrating a body, shown in sectioned and inflated form, produced by a process of the prior art hereinbefore referred to. As shown in that figure, the hollow body is composed of two side-sheet pieces 1 and 2 which are cut out corresponding to the side view outline of the body and are united at the marginal edges of the body portion by seam 5. At the general places on the two sides of the intermediate plane $x$—$x$ of the body, that is the plane defined by the seam 5, where projections, such as ears 6, 6 and legs 7, 7 are to be formed, intermediate pieces 3 and 4 are fitted in between the side sheets 1 and 2. These intermediate pieces consist, as shown, each of a single sheet folded in the middle at 8 and 9, respectively, and united by seams $5a$, $5a$ and $5b$, $5b$ with the side sheets 1 and 2.

The disadvantages attending this old process have already been pointed out. Attention is here particularly directed to the meeting point 10, on Fig. 1, of the three seams, two indicated at $5a$, $5a$ uniting the insert piece 3 to the side pieces 1, 2 and one indicated at 5 uniting the side pieces 1, 2 together, which presents a region of weakness requiring reinforcement as hereinbefore pointed out. Attention is also called to the extreme divergence or spreading of the legs laterally of the body in the form shown in Fig. 1, due, as hereinbefore stated, to the formation of the insert piece with its straight fold. And in contrast with this, attention is called to the side elevation view of the form shown in Fig. 11, as made by our process. As shown in that figure there is no diverging or spreading of the legs laterally of the body but they extend in their natural planes appropriate for that type of figure. This divergence or spreading of the legs apart in an unnatural manner is particularly marked in quadruped animal forms when made by the old method illustrated in Fig. 1, it being practically impossible for such forms to be self-supporting upon their feet in upright position.

Another disadvantage of the old process referred to in connection with Fig. 1 is the difficulty in the formation of the hollow body, of securing the right places for the different intermediate or insertion pieces if more than one are to be inserted.

Likewise, if the hollow body is completely formed without insert pieces by another of the old process hereinbefore referred to, for example by two sheets, 1 and 2, Fig. 6, united by a seam 5, and is to have prominences, such as indicated by the dotted outlines 15, 16, 21, Fig. 7, at different places and lying on both sides of the median plane of the body defined by the enclosing seam 5, then these portions must be separately formed and separately pasted or attached to the completed body portion, with the attendant disadvantages hereinbefore referred to.

Directing attention now to certain fundamental principles involved in our new process, the consideration of which will serve to more clearly present various additional detailed steps which may advantageously be used especially in the production of human and animal forms, reference is had to Figs. 2 and 3. Upon any suitable foundation plate, such as indicated by the numeral 11, are placed the two rubber sheets or plates 3a and 3b, superposed, and which sheets or plates are to serve for the making of the closed two-part intermediate piece employed in our process. By a stamping and welding operation, for example using a properly formed dull edge die, these rubber plates are cut out along the closed outline indicated by the dotted line 5c in Fig. 2. By the use of such a cutting and welding tool and with the plates or sheets 3a and 3b of unvulcanized sticky rubber, these plates are not only cut out, but also at the same time are welded together along the line of the cut, in a manner in and of itself well known. The portions of the two sheets lying about the closed line 5c form a double-flap closed ring to be used as the insert, the doubled insertion piece thus taking the shape of a bilobate flat ring.

Fig. 3 shows the waste portion removed and the two rubber layers or sheets 3a, 3b, cut seamed together along the line 5c, that seam defining the outline of the central aperture in the united sheets or lobes of the bilobate flat ring.

In the next step of the operations, as shown in Fig. 4, the insert piece is temporarily removed from the foundation plate 11, a rubber sheet or plate 1, which is to form a side portion of the body is spread upon that foundation, and upon this is laid the double-flap piece or bilobate flat ring 3a, 3b produced in the first stamping operation. Between the two flaps 3a and 3b of the insert piece is laid a sheet of paper or other thin material which will not stick to the rubber and will prevent adherence together of the two parts 3a, 3b of the insert piece and which material will also not hinder the stamping. It will be understood, of course, that the separating paper or the like must be centrally cut out for its insertion between the flaps 3a, 3b of the insert piece. Then the second sheet, 2, which is to form the opposite side of the body, is placed upon the insert piece. Fig. 4 shows the superposed layers in section ready for the next stamping operation, the paper or the like separator referred to being indicated by the numeral 12.

The whole stack thus formed is thereupon cut through by means of a welding stamp 13 (Fig. 4), the cutting edge 14 of which is formed according to the side view outline of the hollow body to be produced, and which outline is indicated by the dot and dash line 5b in Fig. 3. The outline 5b embraces a greater area than the central stamped out opening of the double flap insert piece 3a, 3b, so that the inner stamp seam 5c, defining this opening in the insert piece, in all its parts, in the particular example shown, lies within the area enclosed by the line 5b which marks the outer marginal seam to be formed between the two parts of the insert piece and the side body pieces. The stamp 13, 14 (Fig. 4) cuts through all the superposed layers and at the same time welds the cut edges of the side sheets to the cut edges of the two flaps of the insert piece along the outline 5b indicated in Fig. 3, that is the side sheet 2 is cut seamed to the flap 3b and the side sheet 1 is cut-seamed to the flap 3a along the outline 5b, while the paper or like separator sheet 12 laid between the flaps of the insert piece prevents the sticking of their cut edges together.

Fig. 5 shows in sectional perspective view a hollow body of simple form produced in this manner. From this figure, it is evident that the hollow body produced consists of the two side sheets 1 and 2 and the insert piece between them, which latter is composed of the two closed flat rings 3a and 3b, connected at their inner circumference by the curvilinear seam 5c and at their outer circumference by the curvilinear seams 5a and 5b, respectively, to the side leaves or layers 1 and 2.

In producing a simple body form such as illustrated in Fig. 5, by those steps of our process illustrated in Figs. 2 to 4 inclusive, it is to be observed that the line indicated at 5c in Fig. 3, along which the first stamp welding was done in the preparation of the insert piece, is of smooth or even contour and approximately of the form of and equidistant from the surrounding line 5b along which the second stamp welding was done in the formation of the outer marginal edges of the sides of the body and insert piece and in the welding of the two flaps of the insert piece to these outer sides along their cut edges. And in consequence, in the completed form the insert piece 3a, 3b is of substantially the same width throughout the body outline. It is therefore apparent that when the complete form, of which Fig. 5 presents a section, is inflated the surface contours along the sides of the body and along the region of the insert piece will be uniform throughout their extents, as is appropriate for a simple form of that character.

In the production of more complicated body forms, however, and especially those simulating human and animal forms, this stamping out and welding must be along lines designed to give the various natural body contours and profiles. For example, in the regions of those portions of the form where no projections, such as arms, legs, ears etc. are to stand out from the inflated body of the form, the insert piece should generally be of less width than in those regions from which those extremities arise. This variation in width, produced by the cooperative relation of the outlines along which the two stamping and welding operations are done, is an important factor in producing the desired surface contours in human and animal forms when inflated. By designed gradations in width through properly curved cut-seamed outlines, graceful contours of the different body portions are produced in the form when inflated, simulating the natural form of the human or animal represented.

Figs. 10 and 11 show, by way of example, the form of a boxer produced in this manner by the process as illustrated in Fig. 8. In the human figure illustrated in front and side view in Figs. 10 and 11, respectively, the upper as well as the lower extremities are positioned in different planes, and the head, face, neck, back and chest are profiled. The stage of the process represented in Fig. 8 corresponds substantially to the stage of the process represented in Fig. 3. In Fig. 8 the two superposed plates 3a, 3b intended to form the insert piece, are stamped out along the curvilinear closed outline 5c, corresponding to the desired profile of the intermediate body portion to be formed by the insert piece. As before, the stamped out material within this outline is waste, the outlying portions 3a, 3b, stamp seamed together along this outline, being retained. The two-part insert piece 3a, 3b is placed on rubber plate 1, designed to form one side piece of the body and the other rubber plate 2, not shown in Fig. 8, but as represented in Fig. 4, designed to form the other side piece of the body, is placed upon the insert piece. As before, a paper or the like separator is placed between the two flaps of the insert piece. This assembled unit, consisting of four layers of the sheet rubber material, is then subjected to the stamping and welding operation hereinbefore described, the general principles of which are diagrammatically illustrated in Fig. 4. The dot and dash line in Fig. 8 indicates the outline of the second stamp which cuts out the outer outline of the complete figure through all layers of the unit, at the same time welding the cut edge of each flap of the insert piece to the cut edge of the adjacent outer side piece, while the paper separator prevents welding of the cut edges of the two flaps of the insert piece together.

The double-flap insert piece, in ring like form after the final stamping, is bounded by the full line 5c (Fig. 8) on the inside and by the dot and dash line on the outside. As can be seen, the insert piece has widely varying widths along its outline. In the place designated by y, in Fig. 8, the width of the insert piece is very small.

In fact, certain delicate profiling, such for example as for the face region in a form simulating the human, may result in such reduction in the completed figure of the width of the particular portion of two-part insert piece lying in that region as to bring the seam joining its two parts very close to the marginal seams.

It is also essential, in order to produce a form which when inflated shall have the shape of animal or human figures, that is to say, a body having extensions appearing in a natural manner on opposite sides, with inwardly curved contours of the body surfaces therebetween and differently curved contours in other body regions, that the ring-like insert piece be of such variations in width along its circumference as to dispose the central seam of this two-part insert piece within the profile presented by the marginal seams in the region of the extensions referred to and on an even profile with or outwardly of the profile of the marginal seams in other body regions such as the back and belly of the representative forms when inflated.

This will more clearly appear from reference again to Figs. 8 to 11 inclusive. In Fig. 8, the line along which the side pieces and the insert piece are to be cut-seamed together is indicated by the dot and dash line and it is shown as of varying approach to the central seam 5c of the two-part insert piece. This variation is also shown in Fig. 9, the dotted line indicating the central seam of the two-part insert piece and the free marginal edges of the figure indicating the marginal seams. When the form is inflated from the flat condition shown in Fig. 9 to the condition shown in Figs. 10 and 11, the insert layers bulge outwardly in certain body regions, such as along the back and belly, to an extent disposing, in some of these regions, the central seam of the insert piece on an even presentation with the marginal seams, that is to substantially the same profile level as the inflated form is viewed by the observer, while in other of these regions the central seam is presented outwardly beyond the profile of the marginal seams, in accordance with the form of curves of the seams and the variation in width of the insert piece. Also in the body regions intermediate the legs, where, as shown in Figs. 8 and 9, the insert piece is of greatest width but also of sharpest curvature of its central seam, the insert piece retains its inward contour to a degree disposing its central seam inwardly of the marginal seams upon inflation of the form.

The hollow body obtained in the manner exemplified in Fig. 8 has, as shown in Fig. 9, four extremities, instead of two for each set of arms and legs, that is, it has four arms 17a, 17b, 18a, 18b and four legs 19a, 19b, 20a, 20b.

To remove the superfluous members, they are cut off by dies or other suitable cutting tool functioning also to weld the cut edges, the result being the form represented in Figs. 10 and 11 which is there shown in inflated condition. In the human figure shown, to properly present the arms and legs on opposite sides of the median plane of the body between the arms and legs, a superfluous member on opposite sides of that plane are cut off. For example, in one set of arms and legs the right extremities are removed and in the other the left. That is to say, in Fig. 9, as an example, the arm and leg members 17b and 19b of one set are removed and the arm and leg members 18a and 20a of the other set are removed, to present the arrangement of left and right arms and legs in the completed and inflated form as shown in the particular example illustrated in Figs. 10 and 11.

It is to be noted that the body region between the limbs and the inner sides of the limbs are formed by the two-part or bilobate insert piece, which insert piece is represented in Fig. 8 as in process of formation, certain fundamental principles of that process being also represented in Figs. 2, 3 and 4 as hereinbefore outlined. It is also to be noted that when the stage represented in Fig. 9 of the production of such a form as represented in Figs. 10 and 11 has been reached, and as the next step the superfluous arm and leg of each set are cut off as last outlined above, the two lobes of the bilobate insertion ring will not be symmetrical, that is they will be asymmetrical, because one lobe will have a right arm and leg part only while the other will have a left arm and leg part only. In other words, the two lobes of the bilobate insertion ring will have different outlines along their marginal seams joining the outer side parts of the form.

Upon the completion of the form as above outlined, it is vulcanized. The inner and outer vulcanization of this type of complicated, inflatable form may be effected by the use of a predetermined quantity of air saturated with sulphurous chloride or of an indifferent gas and then external vulcanization is effected in the known manner. It is well known that the inner vulcanization can take place simultaneously and in perfect manner.

It will be seen that in the last-above described formation of the figure shown in Figs. 10 and 11, the superfluous parts are separately removed after the stamping operations are completed. However, this separate or subsequent operation can be avoided by a modification in the employment of the stamping tools referred to in connection with Fig. 4. Instead of the die with a single cutting edge and employed as shown in Fig. 4, two dies may be used, placed between the two flaps 3a, 3b of the insert piece in the arrangement of all the layers for the final stamping operation, the cutting edge of one die working upwardly, forming the extremities of the body on one side, and the cutting edge of the second die working downwardly and forming the extremities on the other side, as shown in diagram in Fig. 12, this mode of stamping thus producing only two extremities of each set, that is for the arms and the legs. It is to be understood, of course, that the cutting edges of the two dies are properly offset, as in Fig. 12, in the regions required for cut seaming adjacent pairs of layers of the rubber sheets together on marginal lines for the formation of the arm and leg of one set on one side of the body and the formation of the arm and leg of the other set on the opposite side of the body, that is for a right arm and leg and a left arm and leg; also that the cutting edges of the dies are of the proper curvilinear outline to produce the marginal seam, that represented in dotted line in Fig. 8 and in full line in Fig. 9, for the formation of the form in the final stamping operation. In other words, in this final stamping operation, two dies, such as diagrammatically represented in Fig. 12, are substituted for the paper 12 between the two lobes 3a, 3b of the bilobate insertion ring in the assembly of all the layers of rubber together shown in Fig. 4, and then, of course, the upper die edge 14 of Fig. 4 is not employed.

In place of two dies, two steel plates may be used, the cutting edge of one being arranged in upward and that of the other in downward direction as shown in section in Fig. 13. The result is the same but the two steel plates can be fitted together with greater ease and convenience than the dies of Fig. 12. It is to be understood, of course, that the two steel plates are properly apertured at the center so as to be inserted between the two lobes of the bilobate insertion ring. The section of Fig. 13 does not show that aperture but such an aperture is shown in the die plate 24 of Fig. 14.

The purpose sought to be attained can be reached still more advantageously by the use of a single die 24, which is placed between the rubber layers 3a 3b. The cutting edges of this die, conforming to the outlines of the form to be stamped out, lie on opposite sides of the plane of the die body, as shown in Fig. 14. Also this die, provided with a recess 25, in cooperation with a stamp 26, may be used in the first stamping operation in stamping out from the two sheets 3a, 3b the central aperture and welding the sheets together about the aperture outline, the recess in the die and the cutting edge of the stamp 26 being formed of course of the proper contour for that use. This first stamping operation is done, of course, before the rubber plates 1, 2 are placed in the position shown in Fig. 14.

Another modification of the stamping process is shown in Fig. 15. Instead of the process just described, in which a single die is employed with opposite cutting edges, as in Fig. 14, we provide a pair of dies 27, 28, on opposite sides of the four layers of the rubber sheets and with their cutting edges therefore working from opposite directions towards the rubber layers, a rigid plate 29 being placed between the two intermediate layers 3a, 3b to act as a female die. On the upper die 27, a recess or groove may be provided corresponding to the outline along which the first stamping operation must be made in the preparation of the insert, that is the outline indicated at 5c in the illustrative Fig. 8, and this recess enables the stamp 26 to be used in cutting the two sheets 3a, 3b along said outline 5c and in welding these plates together along this line, this stamping and welding operation, of course, being done before the rubber plates 1, 2 are placed in the position in the pile shown in Fig. 15. By such dies and their use in the manner described, the two stamping operations are rapidly performed, and the entire process is carried out accurately and quickly, without the necessity of making time-consuming adjustments of parts.

These stamping operations are particularly adapted for mass production of hollow inflatable rubber bodies whether of the more simple forms or of the more complicated forms simulating human and animal forms.

While performing the same character of stamping operations as outlined above, it has also been found particularly advantageous in the performance of the process and formation of the hollow sheet rubber bodies of the present invention, to use a wire form of stamping die. The particular advantage of a wire form of die here is that such a die can be easily bent in conformity with any complicated outline. This is of particular advantage because the correct outline of these complicated forms cannot be determined in advance, but generally must be attained by repeated experiments and after repeated alterations of the outlines. The rigid and unyielding dies hereinbefore referred to must be made according to a predetermined outline and of course cannot be altered afterwards, so that in many instances, until the correct outline for a certain body has been attained, a great number of useless dies have to be made before arriving at the correct shape. This disadvantage and waste in the performance of the present process and formation of the hollow bodies is avoided by using a wire form of die, which can be easily bent to any desired shape. In addition, a wire of suitable thickness has the inherent advantage, without any shaping of its cross sectional contour, of a cutting edge which on the one hand is sharp enough to cut the unvulcanized rubber sheets used in the process and formation of the article and on the other hand is blunt enough to weld the rubber sheets together at the cut.

Figs. 16 and 17 show diagrammatically such a wire die and its use in the present process, a curvilinear closed form of wire die being diagrammatically shown in each by way of the two cross sections of opposite runs of the wire which would be presented by a cross-sectional view of the die.

Fig. 16 diagrammatically shows a wire die employed in the first stamping operation of the process; that is cutting out the central outline, indicated at 5c in Figs. 2, 3 and 8, of the superposed rubber sheets 3a, 3b, and welding the two flaps together along that outline. In Fig. 16, 11 indicates the solid foundation plate on which the superposed rubber sheets 3a, 3b may be placed. The wire die 30 is shown in cutting position on the topmost sheet 3b, and 31 indicates a press acting upon the wire die to force it in downwardly cutting action to cut the central outline 5c referred to. Of course, it is to be understood that any suitable means, a hand tool or otherwise, may be employed to force the wire die in downwardly cutting position. In the step of the process diagrammatically illustrated in Fig. 16, the wire die 30 will, of course, be of the proper closed curvilinear outline required for the central joining seam of the two part insert piece appropriate for the particular hollow body to be made. For example, in the formation of the hollow body shown in Figs. 10 and 11, the wire die 30 of Fig. 16 would be in substantially the curvilinear closed outline indicated at 5c on Fig. 8.

Fig. 17 likewise diagrammatically shows a wire die employed in the next stamping operation of the process; that is, cutting out the marginal outline of the body through all the four layers of rubber forming it and welding the adjacent pairs of sheets together along the line of the cut. As diagrammatically shown in Fig. 17, the wire die 32 is inserted between the two flaps or lobes 3a, 3b of the bilobate insertion piece formed by the first stamping operation, and above and below that insertion piece are placed the unvulcanized rubber sheets 1 and 2 which are to form the side parts of the completed form. As before 11 indicates the foundation plate upon which all four layers of the rubber sheet material are placed in superposed position and 31 a suitable press or the like, or 11 and 31 may be considered as the press members. In any case, the wire die partakes of both an upward and a downward cutting and welding action. In its upward action, it cuts the required marginal outline through the upper sheet, flap or lobe 3b of the bilobate insertion piece and the upper rubber sheet 2, welding these two sheets together along the line of the cut; and in its downward action the wire die likewise cuts through and welds together along the line of the cut the lower sheet, flap or lobe 3a of the bilobate insertion piece and the lower sheet 1. Here again, the wire die will be of the closed curvilinear outline required to form the marginal seam of the completed form. For example, in the formation of the particular form illustrated in Figs. 8 to 11 inclusive, the wire die will have a closed curvilinear outline such as indicated by the dot and dash line in Fig. 8 and by the full line marginal outline in Fig. 9.

It is to be noted that in the use of the wire die as diagrammatically shown in Fig. 17, no paper separator, such as indicated at 12 in Fig. 4, is required between the two lobes 3a 3b of the bilobate insertion piece to prevent those lobes from being cut-seamed together, the wire die itself, in position between those lobes, operating as such a separator. However, if desired the wire die may be placed above the entire assembly of sheet material to act only in a downward direction through all the four layers of the assembly, as, for example, in the use of the die edge 14 of Fig. 4, and in that case the paper separator 12 would be used between the lobes 3a 3b of the bilobate ring insertion as in the Fig. 4 example.

While in accordance with the provisions of the statute we have illustrated and described the best embodiments of our invention known to us, it will be apparent to those skilled in the art that changes may be made in the subject-matter and form of the invention disclosed without departing from the spirit of the invention as set forth in the appended claims, and that in some cases certain features of our invention may be used to advantage without a corresponding use of other features.

What is claimed is:

1. The process of producing from unvulcanized rubber sheet material hollow inflatable bodies comprising stamping out from two superposed layers of the material and discarding as waste a central portion with the line of stamping along a closed curvilinear line and uniting said layers together along said line of stamping, applying said united layers to like sheet material and stamping out through all said layers and sheet material a body outline completely surrounding the line of stamping in said first mentioned layers and uniting the material along said last mentioned outline to form a closed body.

2. The process of producing from unvulcanized rubber sheet material hollow inflatable bodies comprising stamping out from two superposed sheets and discarding as waste a central portion, with the stamping along a closed curvilinear line, simultaneously welding said sheets together along said line of stamping, inserting said welded sheets between two other sheets, stamping out through all of said sheets a marginal outline of the body form, and uniting each of said inner sheets to its adjacent outer sheet to form the closed body.

3. The process of producing hollow inflatable bodies comprising cutting through two sheets of rubber along a closed curvilinear line, discarding as waste the portions of said sheets within said line of cut and seaming said sheets together along said line of cut to form a bilobate flat ring-like piece, inserting said piece between two rubber sheets, cutting through each lobe of said bilobate piece and the adjacent rubber sheet along a marginal outline and seaming the cut portions together along said line of cut in a manner to complete the body.

4. The process of producing from unvulcanized rubber sheet material a hollow inflatable body simulating a limbed animal comprising cut-seaming two sheets of the material together in a manner to form a bilobate flat ring-like piece, inserting said piece between rubber sheet material and cut seaming one lobe of said piece of said sheet material on one side and the other lobe of said piece to sheet material on the other side along a closed curvilinear line to complete the hollow body.

5. The process of producing from unvulcanized rubber sheets hollow inflatable bodies comprising stamping out from two superposed sheets and discarding as waste a central portion with the line of stamping along a closed curvilinear line and uniting said layers together along said line of stamping, placing said united layers between two other sheets, and stamping out through all of said sheets a body outline completely surrounding the line of stamping in said first mentioned sheets, and uniting the outer margins of each outer sheet to the outer margin of the adjacent inner sheet to form the closed body.

6. The process of producing from unvulcanized rubber sheet material hollow inflatable bodies simulating human or animal forms, comprising forming from two superposed sheets, by stamp welding, a two-part apertured piece having the aperture defined by a central seam joining the two parts along a closed curvilinear line, placing said formed piece as an insert piece between two rubber sheets and stamping out from the pile of sheets a marginal outline of the body to be formed, with said outline surrounding said seam and so varying in line contour with respect thereto as to produce variations in width in said insert piece, and forming marginal seams between each of said parts of said insert piece and the adjacent outer sheet along the line of the last mentioned stamping.

7. The process according to claim 6, and in which the stamping and seaming forming the central seam of said insert piece and said marginal seams are along such relative lines of curvature that the insert piece is presented of greatest width in the region between the outer sides of the legs of the form.

8. The process according to claim 6 and in which said central seam of said insert piece is formed of the contour of the profile desired in a surface portion intermediate the sides when inflated.

9. The process according to claim 6 and in which the stamping and seaming forming the central seam of the insert piece and the marginal seams are along such relative lines of curvature and present such variations in width of the insert piece as to produce in the inflated form a disposal of the central seam of the insert piece between said marginal seams, with those portions of said central seam in the region of the limbs lying inwardly of the profile presented by the marginal seams and with other portions of said central seam presenting a profile outwardly of said marginal seams.

10. The process of producing from unvulcanized rubber sheet material hollow inflatable bodies simulating human or animal forms comprising cutting through each of two rubber sheets along a curvilinear closed line of the contour of the profile desired in an intermediate portion of the body to be formed, discarding the material of the sheets within said line and uniting the remaining portion of the sheets along said line, cutting through each of two other sheets and through the first mentioned united sheets along curvilinear closed lines of the contours of the profiles desired on opposite sides of said intermediate portion, and joining said first mentioned united sheets to said other sheets along their cut edges in a manner to present said first mentioned united sheets between said other sheets as an insert and to complete said closed body.

11. An inflatable form of sheet rubber representative of an object having limbs projecting from the main body portion of said form, comprising a plurality of layers of rubber having regional areas united by marginal seams forming a portion of the body and the limbs, and other regional areas united by a seam extending in a closed outline entirely about the body intermediate the limbs.

12. An inflatable form of sheet rubber comprising a plurality of layers of sheet rubber joined along marginal lines of the uninflated form, said plurality of layers including two outer layers presenting flat sides of the uninflated form and a double layer or bilobate insertion between said outer layers the two layers or lobes of which have different outlines.

13. An inflatable form of sheet rubber as specified in claim 12 and in which said two lobes of said bilobate insertion are joined to the respectively adjacent outer layers along said different outlines.

14. A sheet rubber toy representative of an animal form having legs side by side, comprising two outer layers of rubber forming opposite sides of the body and the outer sides of the legs and intermediate layers of materially less area extending along the entire side outline, said intermediate layers being joined to the outer layers along the entire marginal edges of the outer layers and said intermediate layers being joined together by a closed curvilinear seam.

15. An inflatable rubber toy simulating a human or animal form fitted together from a plurality of pieces of sheet rubber, comprising two sheet rubber pieces forming opposite side body portions and a two-piece insert extending throughout the entire outline of said body, said insert having a central seam uniting its two pieces along a curvilinear line determining a profile or contour of the representative animal body.

16. An inflatable rubber toy simulating a human or animal form fitted together from a plurality of pieces of sheet rubber seamed together at their edges, comprising two sheet rubber pieces forming opposite side body portions and a two-piece insert extending throughout the entire outline of said body, said insert having a central seam uniting its two pieces and marginal seams uniting them to said side body pieces, said central and marginal seams being designed of relative contours and said insert piece of varying widths along said outline to present body contours simulating the animal form represented.

17. An inflatable rubber body consisting of two outer layers of sheet rubber and intermediate layers connected thereto, the intermediate layers being united along a closed curvilinear seam, and in which the body is a rubber toy representative of an animal having limbs projecting from a body portion and in which said curvilinear seam extends between the legs.

18. The process of making hollow bodies by stamp-cutting and welding together along the lines of cut of unvulcanized, weldable rubber sheet material, comprising the formation of a pile of the rubber sheet material in superposed layers and stamp-cutting through and welding together one of said layers and an immediately adjacent layer along a desired closed curvilinear outline by a stamping and a welding die conforming in outline to said closed curvilinear outline, said stamping and welding die being a wire bent to conform to said desired outline.

19. The process of producing hollow inflatable bodies comprising stamping out from two sheets of raw rubber a closed curvilinear outline of an intermediate body portion by means of a welding stamp conforming to said outline, employing the united stamped out portions of said sheets as a double layer insert piece between two raw rubber sheets and stamp welding out the marginal outline of the sides of the body from said last mentioned sheets in a manner to complete the body form, the welding stamp being a wire bent to conform to said closed curvilinear outline.

20. The process of producing hollow inflatable bodies comprising stamping out from two sheets of raw rubber a closed curvilinear outline of an intermediate body portion by means of a welding stamp conforming to said outline, employing the united stamped out portions of said sheets as a double layer insert piece between two raw rubber sheets and stamp welding out the marginal outline of the sides of the body from said last mentioned sheets in a manner to complete the body form, the stamp welding out of the marginal outline of the sides of the body being done by a wire bent to conform to said marginal outline.

In testimony whereof we hereunto affix our signatures.

LAJOS DOROGI.
ISTVÁN DOROGI.